United States Patent
Ambrosi

(10) Patent No.: US 9,410,638 B2
(45) Date of Patent: Aug. 9, 2016

(54) SOLENOID VALVE WITH SHAPED SPRING

(71) Applicant: Massimiliano Ambrosi, Marbach (DE)

(72) Inventor: Massimiliano Ambrosi, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/524,799

(22) Filed: Oct. 27, 2014

(65) Prior Publication Data

US 2015/0090914 A1 Apr. 2, 2015

Related U.S. Application Data

(63) Continuation of application No. 13/181,787, filed on Jul. 13, 2011, now Pat. No. 8,870,160.

(30) Foreign Application Priority Data

Jul. 13, 2010 (DE) .......................... 10 2010 031 275

(51) Int. Cl.
*F16K 31/06* (2006.01)
*B60T 8/36* (2006.01)

(52) U.S. Cl.
CPC ............. *F16K 31/0665* (2013.01); *B60T 8/363* (2013.01)

(58) Field of Classification Search
CPC ..... F16K 27/029; F16K 27/048; F16K 31/06; F16K 31/0655; F16K 31/0696; B60T 8/363; F16F 1/025; F16F 1/34
USPC ...................................... 251/64, 129.15, 337
See application file for complete search history.

(56) References Cited

U.S. PATENT DOCUMENTS

| | | | |
|---|---|---|---|
| 2,140,149 | A | 12/1938 | Arutunoff |
| 2,631,612 | A | 3/1953 | Buescher |
| 2,706,491 | A | 4/1955 | Köhler |
| 3,114,388 | A | 12/1963 | Hoen |
| 3,207,961 | A | 9/1965 | Lohr |
| 3,653,630 | A | 4/1972 | Ritsema |
| 4,108,420 | A | 8/1978 | West et al. |
| 4,465,267 | A | 8/1984 | Chatelin |
| 4,569,504 | A | 2/1986 | Doyle |
| 4,682,135 | A | 7/1987 | Yamakawa |
| 4,971,290 | A | 11/1990 | Dahlmann |
| 5,033,505 | A | 7/1991 | Eidsmore |
| 6,267,350 | B1 | 7/2001 | Slawinski et al. |
| 6,729,347 | B2 | 5/2004 | Ittlinger et al. |
| 6,776,391 | B1 | 8/2004 | Goossens et al. |
| 6,837,478 | B1 | 1/2005 | Goossens et al. |
| 7,108,242 | B2 | 9/2006 | Goossens et al. |
| 8,047,503 | B2 | 11/2011 | Hirt |
| 2001/0023931 | A1 | 9/2001 | Fukano |
| 2002/0083979 | A1 | 7/2002 | Suzuki |
| 2002/0088493 | A1 | 7/2002 | Suzuki |
| 2005/0151104 | A1 | 7/2005 | Goossens et al. |
| 2007/0246673 | A1 | 10/2007 | Bircann |
| 2008/0272208 | A1 | 11/2008 | Anderson et al. |

*Primary Examiner* — Matthew W Jellett
(74) *Attorney, Agent, or Firm* — Maginot, Moore & Beck LLP

(57) ABSTRACT

A solenoid valve for controlling fluids includes a pole core, an armature which is connected to a closing element, and a spring element which is arranged in a working gap between the pole core and the armature. The spring element includes a shaped spring of substantially disk-shaped design. The shaped spring has a curvature with at least one flank region and one dome region, a tangent to the dome region being parallel to an end surface of the pole core.

11 Claims, 4 Drawing Sheets

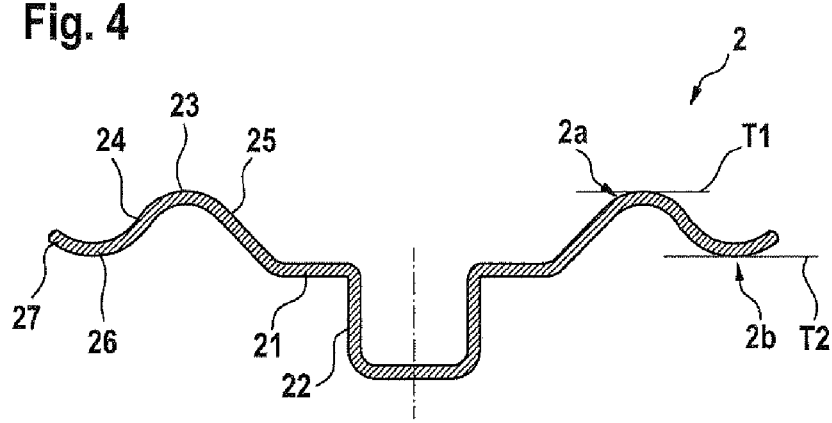
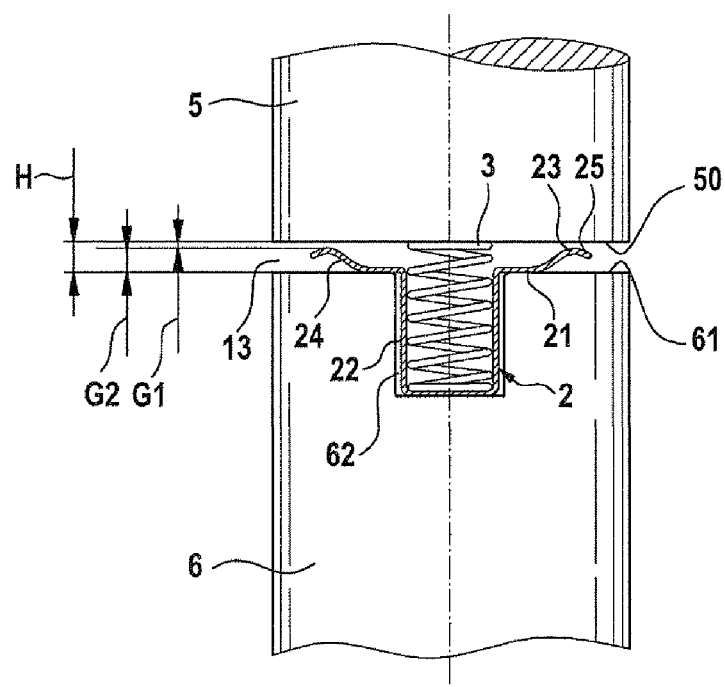

SOLENOID VALVE WITH SHAPED SPRING

This application is a continuation of application Ser. No. 13/181,787, filed on Jul. 13, 2011 (now U.S. Pat. No. 8,870,160), which in turn claims priority under 35 U.S.C. §119 to German patent application no. DE 10 2010 031 275.4, filed Jul. 13, 2010 in Germany, the disclosures of the US application and the DE application being incorporated herein by reference in their entirety.

BACKGROUND

The present disclosure relates to a solenoid valve for controlling fluids, having a shaped spring which is arranged in a working gap between a pole core and an armature.

Solenoid valves are known from the prior art in a variety of embodiments and are used for example in brake systems of vehicles. The known solenoid valves conventionally have a magnet force characteristic in which the magnet force increases very sharply (exponentially) as an axial working gap becomes smaller. Therefore, as the working gap becomes smaller, the solenoid valve can be controlled only with increased actuating forces, and below a predetermined small spacing between the pole pot and the armature, regulation of the solenoid valve is no longer possible. Therefore, in the known solenoid valves, relatively large working gaps are used, such that a valve working range lies in a magnet force range which runs flatter but which at the same time is also of lower magnitude. In particular in the case of solenoid valves which are closed in the electrically de-energized state, however, the available magnet force must be sufficient to open the valve counter to a compression spring which acts in the closing direction. Said compression spring is conventionally designed to be of such a strength that, in the less preloaded state, it can overcome the force of the operating medium acting on the solenoid valve in the opening direction and can close the solenoid valve. Since considerable pressure differences may possibly arise in the operating medium during operation, the compression spring must always provide a force sufficient to ensure that the solenoid valve can be reliably closed even at relatively high operating pressures. This accordingly leads to a compression spring with a relatively high closing force, which in turn has the result that the magnetic circuit of the solenoid valve must provide an opening force which overcomes said spring force. This leads to geometric enlargement of the magnet coil or of other components of the magnetic circuit, which entails not only increased installation space but also additional weight.

SUMMARY

By contrast, the solenoid valve according to the disclosure has the advantage that the solenoid valve is adjustable over a larger stroke range, that is to say in particular even in the case of a small working gap between the pole core and armature. In this way, it is possible according to the disclosure for a structural size of the solenoid valve, in particular of the magnetic circuit, to be reduced. Furthermore, the solenoid valve can be designed with regard to different criteria such as for example improved leak-tightness in the closed state, improved switching time or improved valve dynamics. This is achieved according to the disclosure in that a shaped spring is used which has a substantially disk-shaped design and which has a curvature with at least one flank and one dome region. The dome region is defined according to the disclosure such that a tangent thereto is parallel to an end surface plane of the pole core. The consideration according to the disclosure of using a shaped spring therefore allows the spring characteristic curve to be configured as required, wherein in particular the remaining geometries of the components of the solenoid valve can be produced very easily and at low cost.

It is preferably the case that, in an electrically de-energized state of the solenoid valve, the dome region of the shaped spring makes contact with the end surface of the pole core or with an end side, which is directed toward the pole core, of the armature.

It is particularly preferable for the shaped spring to have a two-stage spring characteristic. The spring characteristic curve thus varies as a function of a size of the working gap between the pole core and armature, such that the spring characteristic can be configured, corresponding to the demanded requirements, as a function of a size of the working gap.

The shaped spring particularly preferably comprises a first curvature with a first dome region and a second curvature with a second dome region, wherein in the electrically de-energized state of the solenoid valve, only one of the two dome regions is in contact with the armature or the pole core. The other of the dome regions therefore comes into contact with the pole core or the armature only when the working gap is reduced slightly, such that a two-stage spring characteristic can be provided. The two curvatures are preferably formed in mutually opposite directions.

Depending on the configuration of the shape of the shaped spring, the spring characteristic varies as a function of a size of the working gap, such that individual adaptations to different fields of use are possible in a simple manner by means of different shapes of the shaped spring.

Alternatively, the solenoid valve also comprises a second spring element, wherein in the electrically de-energized state of the solenoid valve, either the second spring element or the shaped spring is in contact with the armature or the pole core. The two-stage spring characteristic can therefore be provided through the use of two spring elements. It is particularly preferable here for the second spring element to be a cylindrical helical spring. It is however also alternatively possible for a shaped spring to be used as a second spring element.

According to a further preferred embodiment of the disclosure, the shaped spring has a fixing region and the armature has a cutout for receiving the fixing region. Simple fastening of the shaped spring to the armature is possible in this way. Here, it is particularly preferable for the fixing region of the shaped spring to be cylindrical. Alternatively, if two spring elements are used, one of the two spring elements may be fastened to the armature and the other spring element is fastened to the spring element fastened to the armature.

To ensure reliable deformability of the shaped spring in the activated state of the solenoid valve, the shaped spring preferably has cutouts in order to permit a flow of the medium situated in the working gap through the shaped spring. The cutouts are preferably slots in the shaped spring, which slots extend up to an inner and/or outer edge of the shaped spring or slot-shaped, closed recess in the spring body.

BRIEF DESCRIPTION OF THE DRAWING

Preferred exemplary embodiments will be described in detail below with reference to the appended drawing, in which:

FIG. 4 shows an enlarged sectional illustration of a shaped spring of the first exemplary embodiment, FIG. 5 shows a schematic illustration of a solenoid valve according to a second exemplary embodiment of the disclosure.

DETAILED DESCRIPTION

A solenoid valve 1 according to a first preferred exemplary embodiment of the disclosure will be described in detail below with reference to FIGS. 1 to 4.

Figure 1:
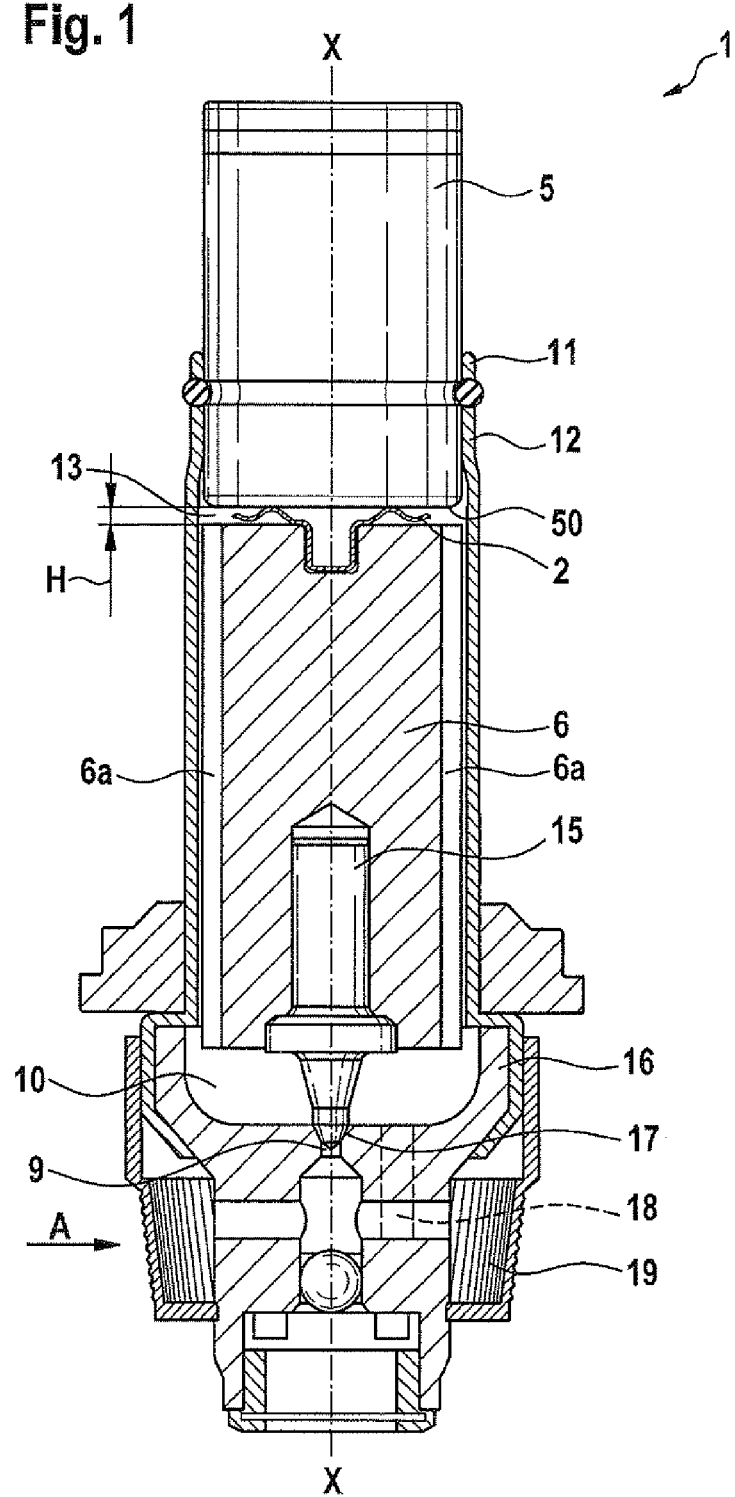
FIG. 1 shows a schematic sectional view of a solenoid valve according to a first exemplary embodiment of the disclosure.

FIG. 1 shows the basic design of the solenoid valve according to the disclosure. The solenoid valve 1 comprises a pole core 5 and an armature 6. A closing element 15 is arranged on the armature 6 on a side facing away from the pole core 5. The closing element 15 closes off or opens up a passage 9 in a valve body 16 at a valve seat 17. FIG. 1 shows the closed position obtained in the case of a solenoid valve which is switched in the electrically de-energized state. When electrically energized, the armature 6 is pulled toward the pole core 5 and the closing element 15 opens up the passage 9. Also provided in the valve body 16 are outlet bores 18 via which the fluid flowing in through a filter 19 (arrow A) firstly passes through the passage 19 into the pressure chamber 10 and is then discharged via the outflow bores 18.

Between the pole core 5 and the armature 6 there is provided a working gap 13 which, in the electrically de-energized state, has a size H. The working gap 13 is connected via lateral ducts 6a in the armature 6 to the pressure chamber 10.

A shaped spring 2 is arranged in the working gap 13 between the pole core 4 and the armature 6, which shaped spring is shown in detail in FIG. 4. Here, the shaped spring 4 is of substantially disk-shaped design with a certain shape. As shown in FIG. 4, the shaped spring 2 comprises a base region 21 and, adjoining the latter radially to the inside, a fixing region 22. The fixing region 22 serves for fixing the spring element 2 in the armature 6. A cutout 62 formed in the armature 6 may be provided here such that the shaped spring 2 can be fastened for example by means of positive locking and/or non-positive locking. Furthermore, the shaped spring 2 comprises a first curvature 2a with a first dome region 23, a first flank region 24 and a second flank region 25. The first dome region 23 lies between the first and second flank regions 24 and 25, with the second flank region 25 adjoining the base region 21 (cf. FIG. 4). Furthermore, the shaped spring 2 comprises a second curvature 2b with a second dome region 26 adjoining the first flank region 24, and also a third flank region 27 adjoining the second dome region 26 (cf. FIG. 4). Here, the third flank region 27 is flatter and shorter than the first and second flank regions 24, 25. Here, the first dome region 23 is defined such that, when a tangent T1 is applied, said tangent is parallel to an end surface 50 of the pole core 5. The second dome region 26 is defined such that, when a tangent T2 is applied, the tangent T2 is parallel to an end side surface 61 of the armature 6.

Figure 2:
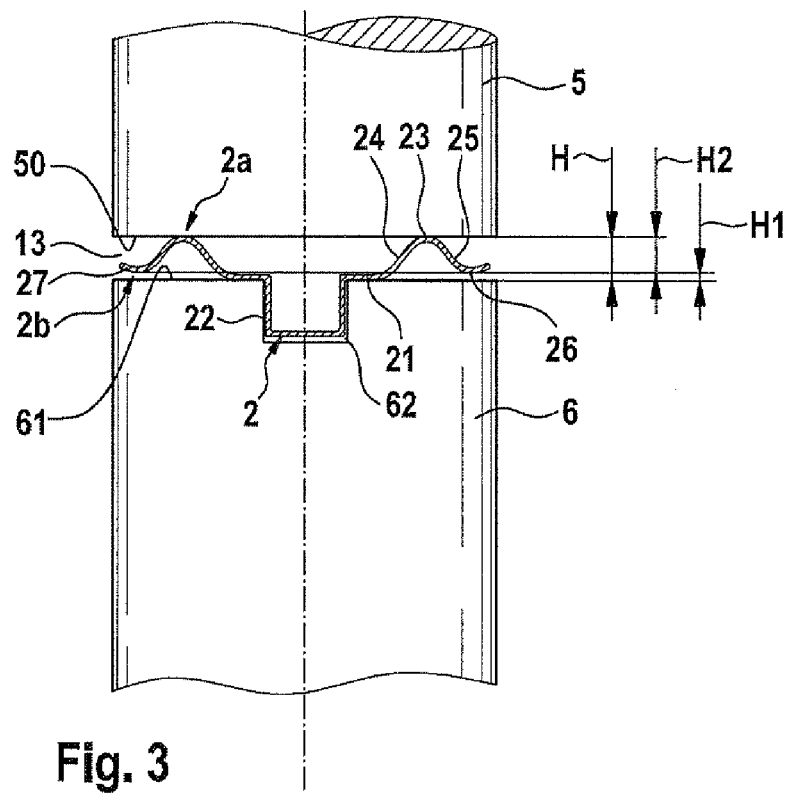
FIG. 2 shows a schematic enlarged illustration of a partial region of the solenoid valve.
Figure 3:
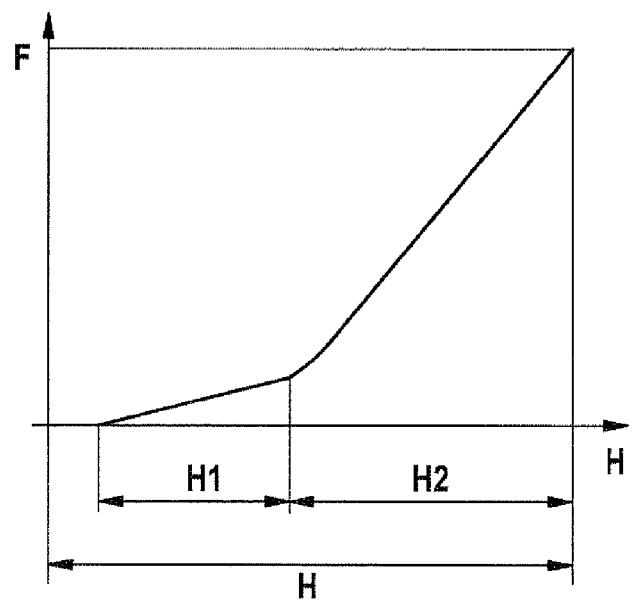
FIG. 3 shows a diagram illustrating the spring force versus the size of the working gap.

The spring element 2 of the first exemplary embodiment is therefore constructed such that the first dome region 23 and the second dome region 26 in conjunction with the adjoining flank regions define the spring characteristics of the shaped spring 2. Since it is the case that, in the electrically de-energized state of the solenoid valve, as can be seen from FIG. 2, the first dome region 23 is in contact with the end surface 50 but the second dome region 26 still has a spacing H1 to the end side 61 of the armature 6, a two-stage spring characteristic is obtained. The spring characteristic of the shaped spring 2 of the first exemplary embodiment is shown in FIG. 3, which shows the spring force F versus a stroke H of the armature 6. Here, the stroke H corresponds to the size of the working gap 13 in the electrically de-energized state of the solenoid valve, as shown in FIGS. 1 and 2.

As can be seen from FIG. 3, the result is therefore firstly the spring characteristic curve illustrated in FIG. 3 in the region H1 as the armature 6 begins to be attracted in the direction of the pole core 5. When the second dome region 26 comes into contact with the end side 61 of the armature 6, this results in a bend in the spring characteristic curve and the spring characteristic curve has the characteristic shown in the region H2 in FIG. 3. When the solenoid valve is electrically de-energized, the shaped spring 2 returns the armature into the initial position shown in FIG. 1 and closes the passage 9.

The shaped spring according to the disclosure therefore has two separate spring regions at the first and second dome regions 23, 26, wherein a contact region between the shaped spring 2 and the pole core 5 travels radially outward during the compression. The two spring regions are provided by the two curvatures 2a, 2b which are formed in one of the opposite directions. Here, the geometry of the curvatures of the dome regions 23 and 26 and the spacing H1 between the second dome region 26 and the end side 61 or a spacing H2 between the first dome region 23 and the second dome region 26 in the axial direction X-X of the valve determine the spring characteristics. In this exemplary embodiment, the spring characteristics are defined by two linear spring force profiles with different gradients.

A further particular advantage of the shaped spring according to the disclosure is that the shaped spring can be inserted between a planar end surface 50 of the pole core and a planar end side 61 of the armature 6. This results in large cost advantages during the production of the pole core 5 and armature 6. Also, the shaped spring according to the disclosure is more robust with regard to assembly-induced or operation-induced radial axial offset of the components, because the shaped spring 2 according to the disclosure bears against the planar end surfaces of the pole core and armature and does not require geometrically definite support points. Furthermore, the shaped spring 2 has the advantage that no sharp edges of the shaped spring make contact with the contact surfaces of the armature and pole core, such that the pole core and the armature can be produced from non-hardened materials, and no adverse effects or wear phenomena occur over the service life of the shaped spring. Furthermore, the special shaping in particular of the third flank region 27, which is of very flat design, serves to provide an increasing contact surface area between the shaped spring 2 and the armature 6 as the shaped spring 2 is bent open, such that load-reducing effects (Hertzian stress) are obtained with the increased contact surface area.

Therefore, according to the disclosure, a solenoid valve 1 is provided which has improved adjustability while being of very simple, cheap design.

Figure 6:
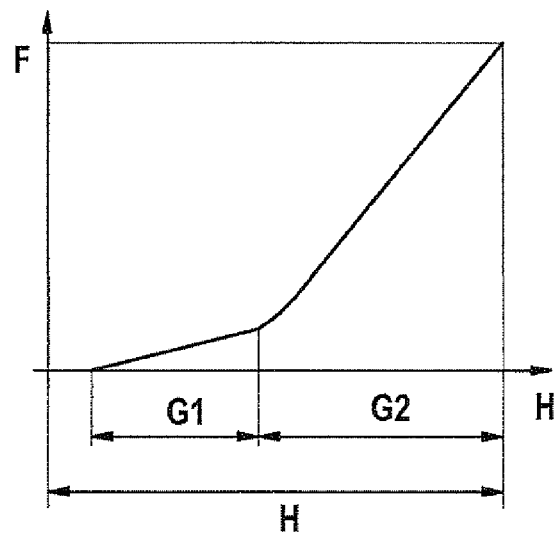
FIG. 6 shows a diagram of a spring force versus a size of the working gap of the second exemplary embodiment.

A solenoid valve according to a second exemplary embodiment of the disclosure will be described below with reference to FIGS. 5 and 6, wherein identical or functionally identical parts are denoted by the same reference numerals as in the first exemplary embodiment.

As can be seen from FIG. 5, the solenoid valve of the second exemplary embodiment additionally has a second spring element 3. The second spring element 3 is a cylindrical helical spring and is arranged in the fixing region 22 of the shaped spring 2. As can be seen from FIG. 5, the second spring element 3 is in contact with the end surface 50 of the pole core 5 and the first spring element 2 has a spacing G1 to the end surface 50. In contrast to the first exemplary embodiment, the shaped spring 2 of the second exemplary embodiment has only precisely one curvature with a dome region 23. Here, the spring characteristic shown in FIG. 6 is similar to that of the first exemplary embodiment, wherein said spring characteristic is provided in the second exemplary embodiment by two different spring elements, specifically the shaped spring 2 and the second spring element 3. As can be seen from FIG. 6 in conjunction with FIG. 5, when the armature 6 is attracted in the direction of the pole core 5, firstly the distance G1 is covered in which only the second spring element 3 is active. After the distance G1 has been covered, the dome region 23 of the shaped spring 2 comes into contact with the end surface 50 of the pole core 5, such that the characteristic of the spring characteristic curve changes, because now both springs are active. This is illustrated in FIG. 6 in the region G2.

In said exemplary embodiment, the shaped spring 2 has a particularly simple design. As a second spring element, use may be made of a simply constructed cylindrical helical spring.

Figure 7:
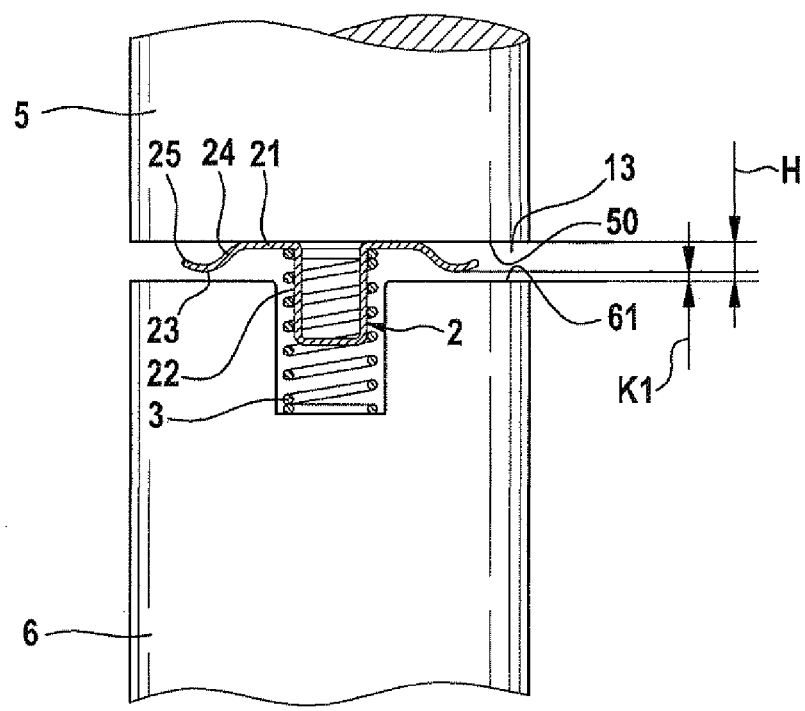
FIG. 7 shows a schematic illustration of a solenoid valve according to a third exemplary embodiment of the disclosure.

FIG. 7 shows a third exemplary embodiment of a solenoid valve according to the disclosure which is similar to the second exemplary embodiment, wherein again identical or functionally identical components are denoted by the same reference numerals.

In the third exemplary embodiment, the shaped spring 2 is fixed in the second spring element 3. The second spring element 3 is likewise a cylindrical helical spring, and a fixing region 22 of the shaped spring 2 is inserted into the inner region of the helical spring and thereby fixed. A base region 21 of the shaped spring 2 is in contact with the end surface 50 of the pole core 5. The shaped spring 2 in turn comprises only precisely one curvature with a dome region 23 which is arranged with a spacing K1 to an end side 61 of the armature 6. Here, the spring characteristic curve of said exemplary embodiment is likewise again of two-stage configuration, because firstly only the second spring element 3 is compressed and then compression of the shaped spring 2 takes place only when the dome region 23 comes into contact with the end side 61.

As shown by the described exemplary embodiments, it is therefore possible according to the disclosure, by means of the concept of using a shaped spring 2, to obtain a simpler construction of the solenoid valve, and in particular to obtain a spring characteristic optimized in each case to certain applications by means of corresponding design of the shaped spring or through the use of a second spring element 3. If two springs are used, the two springs are preferably activated in succession. It should however be noted that by means of corresponding shaping of the shaped spring 2, it is also possible, if two springs are used, for said springs to be deformed simultaneously, such that by means of the shaping of the shaped spring 2, during a corresponding change in a size H of the working gap 13 between the pole core 5 and the armature 6, a spring characteristic curve is obtained which varies over the travel.

What is claimed is:

1. A solenoid valve for controlling fluids, comprising:
   a pole core;
   an armature which is connected to a closing element;
   a spring element which is arranged in a working gap between the pole core and the armature, wherein the spring element includes a shaped spring of substantially disk-shaped configuration; and
   a second spring element arranged in the working gap between the pole core and the armature,
   wherein in the electrically de-energized state of the solenoid valve, either only the second spring element or only the shaped spring is in contact with the armature or the pole core, and
   wherein the shaped spring is configured to possess a curvature defined in the radial direction and extending around the circumference of the spring element with at least one flank region and one dome region radially offset from the center of the disk-shaped configuration, a tangent spanning across the dome region being parallel to an end surface of the pole core,
   wherein the shaped spring has a fixing region, separate from said at least one flank region and one dome region, and the armature has a cutout configured to receive the fixing region.

2. The solenoid valve according to claim 1, wherein, in an electrically energized state of the solenoid valve, the dome region of the shaped spring makes contact with the end surface of the pole core or an end side of the armature.

3. A solenoid valve for controlling fluids, comprising:
   a pole core;
   an armature which is connected to a closing element; and
   a spring element which is arranged in a working gap between the pole core and the armature,
   wherein the spring element includes a one-piece disk configuration shaped to possess a curvature with at least one flank region and one dome region, a tangent to the dome region being parallel to an end surface of the pole core, the dome region including a first curvature with a first dome region and a second curvature with a second dome region,
   wherein the spring element has a two-stage spring characteristic as the armature moves toward the pole core across the working gap, and
   wherein in the electrically de-energized state of the solenoid valve, only the first dome region is in contact with the pole core and the second dome region is not in contact with either the armature or the pole core.

4. The solenoid valve according to claim 1, wherein the second spring element includes a cylindrical helical spring.

5. The solenoid valve according to claim 1, wherein the fixing region is configured for locking in the cutout.

6. The solenoid valve according to claim 1, wherein the shaped spring has cutouts configured to permit a flow of the fluid situated in the working gap through the shaped spring when the shaped spring is in contact with both said pole core and said armature.

7. The solenoid valve according to claim 1, wherein said shaped spring includes a radially extending innermost flank region radially inboard of said dome region and a radially extending outermost flank region radially outboard of said dome region, in which said innermost flank region is curved and said outermost flank region of the shaped spring is flatter than said innermost flank region.

8. The solenoid valve according to claim 7, wherein the shaped spring has a first curvature with a first dome region adjacent said innermost flank region and has a second curvature with a second dome region between said first dome region and said outermost flank region, said first and second dome region separated by a curved flank region.

9. A solenoid valve for controlling fluids, comprising:
   a pole core;
   an armature which is connected to a closing element; and a spring element which is arranged in a working gap between the pole core and the armature, wherein the spring element includes a shaped spring of substantially disk-shaped configuration, the shaped spring having a first curvature with a first dome region projecting toward one of said pole core and armature, and having a second curvature with a second dome region projecting toward one of said pole core and armature, said first and second dome region configured so that in the electrically de-energized state of the solenoid valve only said first dome region applies a spring force to either the armature or the pole core and said second dome region does not apply a spring force to either the armature or the pole core, and so that in the electrically energized state of the solenoid valve the second dome region contacts the other of the armature or the pole core.

10. The solenoid valve according to claim 9, wherein said first dome region projects towards one of said pole core and armature, and said second dome region projects toward the other of said pole core and armature.

11. The solenoid valve according to claim 9, wherein said spring element further comprises a substantially flat flank region configured to contact said one of the armature and pole core after contact by said second dome region.

* * * * *